United States Patent
Wang et al.

(10) Patent No.: US 11,733,760 B2
(45) Date of Patent: Aug. 22, 2023

(54) ELECTRONIC DEVICE AND METHOD THEREOF FOR CONTROLLING POWER CONSUMPTION OF ELECTRONIC DEVICE IN BUSY-WAITING STATE

(71) Applicant: Shanghai Zhaoxin Semiconductor Co., Ltd., Shanghai (CN)

(72) Inventors: Weilin Wang, Beijing (CN); Yingbing Guan, Shanghai (CN); Long Cheng, Shanghai (CN)

(73) Assignee: SHANGHAI ZHAOXIN SEMICONDUCTOR CO., LTD., Shanghai (CN)

( * ) Notice: Subject to any disclaimer, the term of this patent is extended or adjusted under 35 U.S.C. 154(b) by 57 days.

(21) Appl. No.: 17/527,292

(22) Filed: Nov. 16, 2021

(65) Prior Publication Data
US 2023/0126081 A1 Apr. 27, 2023

(30) Foreign Application Priority Data
Oct. 22, 2021 (CN) .......................... 202111231354.3

(51) Int. Cl.
*G06F 1/3228* (2019.01)
*G06F 1/329* (2019.01)
(52) U.S. Cl.
CPC ............ *G06F 1/3228* (2013.01); *G06F 1/329* (2013.01)

(58) Field of Classification Search
CPC ............................... G06F 1/3228; G06F 1/329
USPC ......................................................... 713/323
See application file for complete search history.

(56) References Cited

U.S. PATENT DOCUMENTS

| | | | |
|---|---|---|---|
| 6,446,213 B1* | 9/2002 | Yamaki | G06F 1/206 713/340 |
| 8,464,035 B2* | 6/2013 | Dixon | G06F 9/30083 713/1 |
| 2009/0132835 A1* | 5/2009 | Ehmann | G06F 1/3203 713/300 |
| 2013/0185580 A1* | 7/2013 | Dixon | G06F 9/30083 713/323 |

\* cited by examiner

*Primary Examiner* — Chun Cao
(74) *Attorney, Agent, or Firm* — McClure, Qualey & Rodack, LLP (57) ABSTRACT

A method of an electronic device for controlling power consumption includes the following steps. A busy-waiting command is received, wherein the busy-waiting command indicates that the operating system of a processing device is in a busy-waiting state. The microcode of the busy-waiting command is obtained according to the busy-waiting command. A waiting enabling command is generated and a counting value corresponding to the waiting enabling command is obtained according to the microcode. According to the waiting enabling command, the subsequent microcode is stopped sending to the processing device, so that the processing device enters an idle state, and the counter is enabled to start counting according to the counting value.

12 Claims, 6 Drawing Sheets

ELECTRONIC DEVICE AND METHOD THEREOF FOR CONTROLLING POWER CONSUMPTION OF ELECTRONIC DEVICE IN BUSY-WAITING STATE

CROSS REFERENCE TO RELATED APPLICATIONS

This application claims priority of China Patent Application No. 202111231354.3, filed on Oct. 22, 2021, the entirety of which is incorporated by reference herein.

BACKGROUND OF THE INVENTION

Field of the Invention

The present invention relates to an electronic device, and in particular, it relates to an electronic device and a method thereof for controlling power consumption.

Description of the Related Art

Generally, in processing the kernel code of an operating system of a processor, a situation is often encountered in which the system is busy and the processing must wait, and the busy-waiting time is counted by a time-stamp counter (TSC) inside the processor. However, while the operating system is in the busy-waiting process, a core of the processor is continuously working, so the power consumption of the processor is still high during the time of the busy-waiting process. Therefore, how to control the power consumption of a processor in a busy-waiting state has become a focus for technical improvements by various manufacturers.

BRIEF SUMMARY OF THE INVENTION

The present invention provides an electronic device and a method thereof for controlling power consumption, thereby effectively controlling the power consumption of an electronic device in a busy-waiting state.

The present invention provides a method of an electronic device for controlling power consumption, which includes the following steps. A busy-waiting command is received, wherein the busy-waiting command indicates that the operating system of a processing device is in a busy-waiting state. The microcode of the busy-waiting command is obtained according to the busy-waiting command. A waiting enabling command is generated and a counting value corresponding to the waiting enabling command is obtained according to the microcode. According to the waiting enabling command, a subsequent microcode is stopped sending to the processing device, so that the processing device enters an idle state, and the counter is enabled to start counting according to the counting value.

The present invention additionally provides an electronic device, which includes a processing device and a control device. The processing device is configured to receive a busy-waiting command, wherein the busy-waiting command indicates that an operating system of the processing device is in a busy-waiting state. The processing device is configured to obtain the microcode of the busy-waiting command according to the busy-waiting command, and generate a waiting enabling command and obtain a counting value corresponding to the waiting enabling command according to the microcode. The control device is coupled to the processing device and includes a counter. The control device is configured to receive the waiting enabling command, and according to the waiting enabling command, the control device is configured to stop sending a subsequent microcode to the processing device, so that the processing device enters an idle state, and the counter is enabled to start counting according to the counting value.

According to the electronic device and the method thereof for controlling power consumption disclosed by the present invention, the processing device receives the busy-waiting command, wherein the busy-waiting command indicates that the operating system of the processing device is in the busy-waiting state. The processing device obtains the microcode of the busy-waiting command according to the busy-waiting command, and generates the waiting enabling command and obtains the counting value corresponding to the waiting enabling command according to the microcode. According to the waiting enabling command, the control device stops sending the subsequent microcode to the processing device, so that the processing device enters an idle state, and the counter is enabled to start counting according to the counting value. Therefore, the power consumption of the electronic device in a busy-waiting state may be effectively controlled, so as to increase the convenience of use.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

In each of the following embodiments, the same reference number represents an element or component that is the same or similar.

Figure 1:
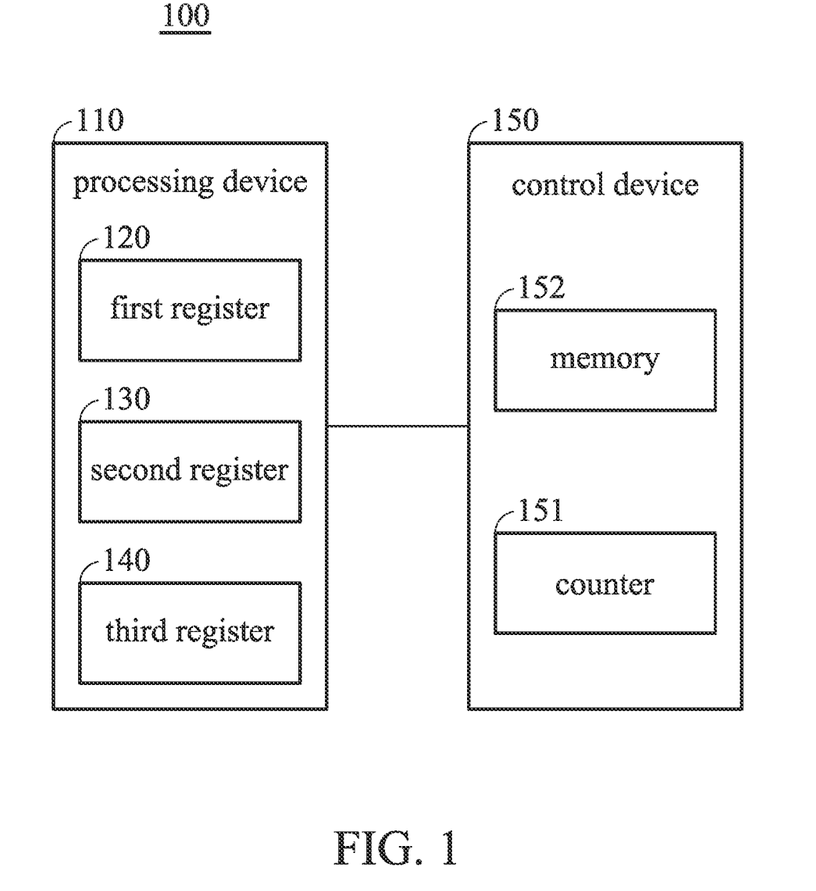
FIG. 1 is a schematic view of an electronic device according to an embodiment of the present invention.

FIG. 1 is a schematic view of an electronic device according to an embodiment of the present invention. Please refer to FIG. 1. The electronic device 100 includes a processing device 110 and a control device 150.

In the embodiment, the processing device 110 may be a central processing unit (CPU) and includes at least one core. The processing device 110 may receive a busy-waiting command (such as ZXPAUSE), wherein the busy-waiting command indicates that an operating system (OS) of the processing device 110 is in a busy-waiting state. For example, when a kernel code of the operating system of the processing device 110 encounters a busy-waiting situation, the operating system may generate, for example, the busy-waiting command to the processing device 110 to indicate the operating system is in the busy-waiting state.

Then, the processing device 110 may obtain the microcode of the busy-waiting command according to the busy-waiting command. In the embodiment, when the processing device 110 receives the busy-waiting command, the processing device 110 may perform, for example, a decoding process on the busy-waiting command to obtain the microcode of the busy-waiting command.

Afterward, the processing device 110 may generate a waiting enabling command (such as wait_nclk_u) and obtain a counting value corresponding to the waiting enabling command according to the microcode. In the embodiment, the above counting value is used to indicate a waiting time required by the processing device 110 when the operating system is in the busy-waiting state.

Furthermore, the processing device 110 may further include a first register 120, a second register 130 and a third register 140. In the embodiment, the first register 120 is, for example, an EDX register, the second register 130 is, for example, an EAX register, and the third register 140 is, for example, a model-specific register (MSR), but the embodiment of the present invention is not limited thereto.

When the processing device 110 generates the waiting enabling command according to the microcode, the processing device 110 may read a first register 120 and a second register 130 of the processing device 110 to obtain a first digit of the first register 120 and a second digit of the second register 130, and generate a first value according to the first digit and the second digit. In the embodiment, the first digit is, for example, low 32 bits, the second digit is, for example, high 32 bits, and the first value (such as (EDX:EAX)) is, for example, 64, but the embodiment of the present invention is not limited thereto.

That is, after the processing device 110 reads the first register 120 and the second register 130, the processing device 110 may combine the first digit of the first register 120 and the second digit of the second register 130 to form the first value, so that the above first value may be used as a waiting time required by the processing device 110 when the operating system is in the busy-waiting state. In addition, the above first value may be configured, for example, by a software executed by the processing device 110.

Then, the processing device 110 may read a third register 140 of the processing device 110 to obtain a second value. In the embodiment, the second value may be used as a waiting time required by the processing device 110 when the operating system is in the busy-waiting state. In addition, the above second value may also be configured, for example, by the software executed by the processing device 110 and through the third register 140.

Afterward, when the processing device 110 obtains the first value and the second value, the processing device 110 may select the first value or the second value as the counting value corresponding to the waiting enabling command. For example, the processing device 110 may select the first value or the second value as the counting value corresponding to the waiting enabling command according to the magnitude of the first value and the second value. That is, when the processing device 110 obtains the first value and the second value, the processing device 110 may determine whether the first value is greater than the second value. When determining that the first value is greater than the second value, the processing device 110 may select the second value as the counting value corresponding to the waiting enabling command. When the first value is not greater than the second value, the processing device 110 may select the first value as the counting value corresponding to the waiting enabling command.

In the embodiment, the control device 150 may be a component on a pipeline of a processor, such as a microcode controller (ucode controller). The control device 150 is coupled to the processing device 110 and includes a counter 151. The control device 150 may receive the waiting enabling command generated by the processing device 110, and according to the waiting enabling command, the control device 150 stops sending a subsequent microcode to the processing device 110, so that the processing device 110 enters an idle state, and the counter 151 is enabled to start counting according to the counting value. That is, during the period when the counter 151 starts counting and the control device 150 stops sending the subsequent microcode to the processing device 110 (i.e., stopping sending the microcode that is in the microcode sequence needing to be processed by the processing device 110 and ranked behind receiving the waiting enabling command, wherein the above microcode is the subsequent microcode), then the processing device 110 (such as the core of the processor) may be in an idle state (i.e., the pipeline of the processor may be in an idle state), so as to decrease the power consumption of the processing device 110. Therefore, the power consumption of the processing device 110 in the busy-waiting state may be effectively controlled, so as to increase the convenience of use.

For example, in the embodiment, when the counter 151 starts counting according to the counting value (such as the first value or the second value), the counter 151 may decrease the counting value, for example, by 1 every cycle. Then, the control device 150 may determine whether the counting value reaches a predetermined value. In the embodiment, the predetermined value is, for example, 0, but the embodiment of the present invention is not limited thereto.

When the control device 150 determines that the counting value does not reach the predetermined value (such as 0), the counter 151 continues counting (for example, continuing decreasing the counting value by 1 every cycle), and the control device 150 continuously stops sending the subsequent microcode to the processing device 110. The processing device 110 is still in the idle state, so as to decrease the power consumption of the processing device 110.

In addition, when determining that the counting value reaches the predetermined value (such as 0), the counter 151 may stop counting, and the control device 150 resumes sending the subsequent microcode to the processing device 110, so that the processing device 110 returns to the normal operation mode. That is, the control device 150 may fetch the subsequent microcode from a memory 152 (such as a microcode read only memory (ucode ROM)) and send the subsequent microcode to the processing device 110, and the processing device 110 may operate normally to process the subsequent microcode sent by the control device 150. It can be seen that during the period when the counter 151 starts counting and the control device 150 stops sending the subsequent microcode to the processing device 110 (i.e., the waiting time required by the electronic device 100 when the operating system in the busy-waiting time), if the counting value of the counter 151 reaches the predetermined value, the processing device 110 may exit the idle state and return to the normal mode, so as to process the subsequent microcode sent by the control device 150.

In addition, after the counter 151 starts counting and the control device 150 stops sending the subsequent microcode to the processing device 110, the operating system of the processing device 110 generates, for example, an interrupt command. In the embodiment, the interrupt command is, for example, a system management interrupt. Then, the control device 150 may save the current operating state of the processing device 110 (i.e., recording and saving the operating state of the electronic device 100 before the interrupt command) and perform the interrupt handler. In the embodiment, the interrupt handler is, for example, a system management interrupt handler.

Afterward, the control device 150 may resume sending the subsequent microcode to the processing device 110 according to the interrupt command, so that the processing device 110 returns to a normal operation mode. That is, after following the current operating state of the processing device 110, the control device 150 may fetch the subsequent microcode from the memory 152 (such as the microcode read only memory) and send the subsequent microcode to the processing device 110, and the processing device 110 may operate normally to process the subsequent microcode sent by the control device 150. It can be seen that during the period when the counter 151 starts counting and the control device 150 stops sending the subsequent microcode to the processing device 110 (i.e., the waiting time required by the electronic device 100 when the operating system in the busy-waiting time), if the operating system of the processing device 110 generates the interrupt command, the processing device 110 may exit the idle state and return to the normal mode, so as to process the subsequent microcode sent by the control device 150.

Figure 2:
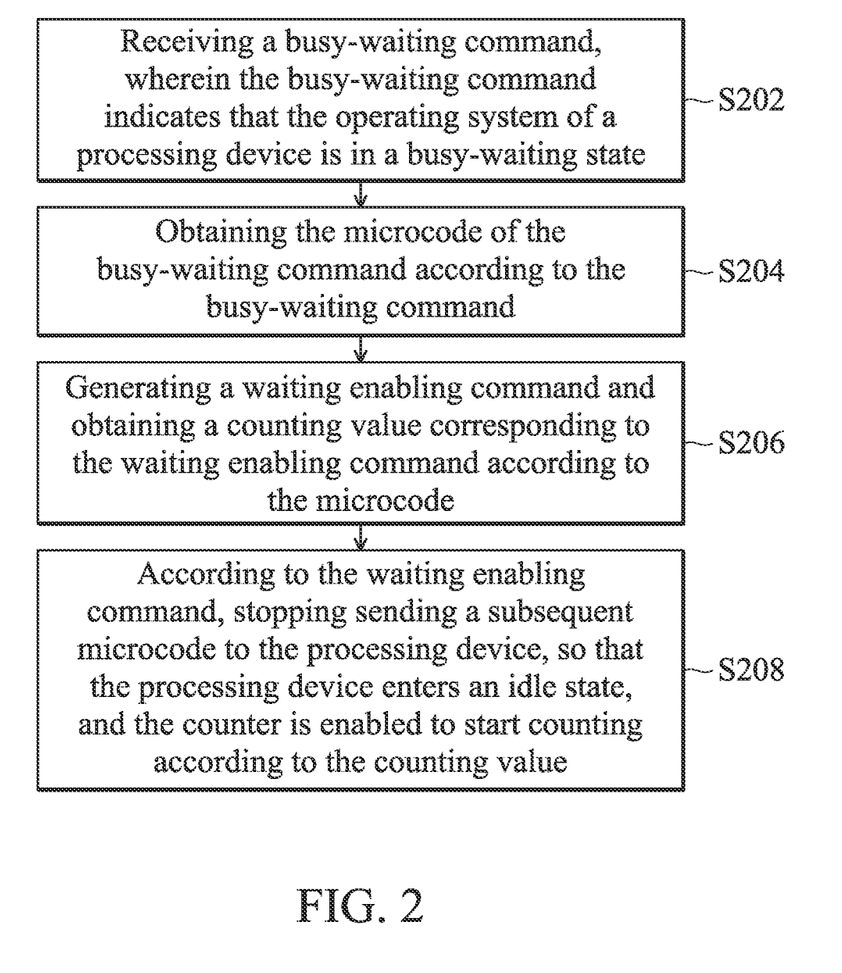
FIG. 2 is a flowchart of a method of an electronic device for controlling power consumption according to an embodiment of the present invention.

FIG. 2 is a flowchart of a method of an electronic device for controlling power consumption according to an embodiment of the present invention. In step S202, the method involves receiving a busy-waiting command, wherein the busy-waiting command indicates that the operating system of a processing device is in a busy-waiting state. In step S204, the method involves obtaining the microcode of the busy-waiting command according to the busy-waiting command.

In step S206, the method involves generating a waiting enabling command and obtaining a counting value corresponding to the waiting enabling command according to the microcode. In step S208, the method involves according to the waiting enabling command, stopping sending a subsequent microcode to the processing device, so that the processing device enters an idle state, and the counter is enabled to start counting according to the counting value.

Figure 3:
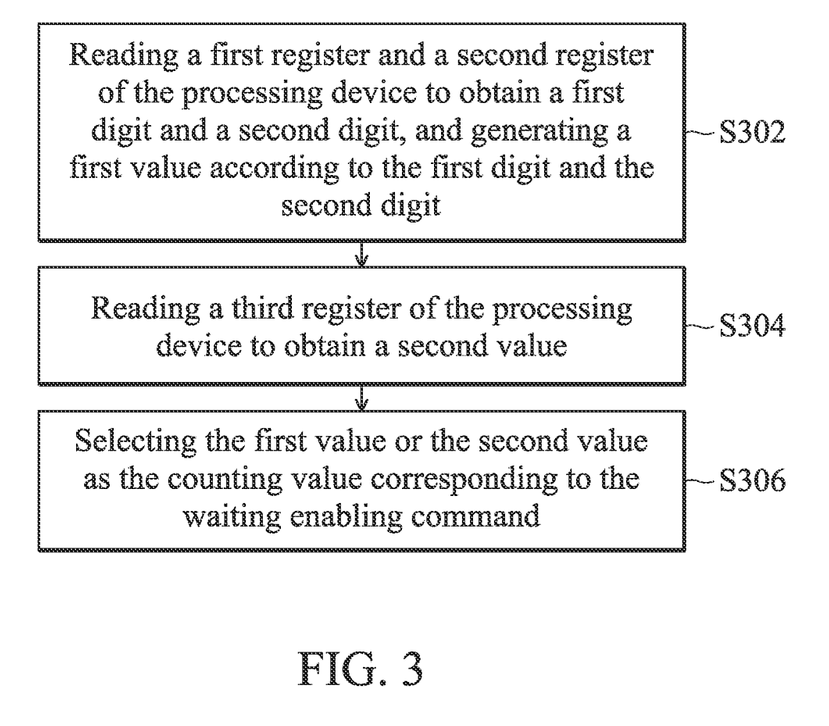
FIG. 3 is a detailed flowchart of step S206 in FIG. 2.

FIG. 3 is a detailed flowchart of step S206 in FIG. 2. In step S302, the method involves reading a first register and a second register of the processing device to obtain a first digit and a second digit, and generating a first value according to the first digit and the second digit. In step S304, the method involves reading a third register of the processing device to obtain a second value. In step S306, the method involves selecting the first value or the second value as the counting value corresponding to the waiting enabling command. In the embodiment, the first register is, for example, an EDX register, the second register is, for example, an EDX register, and the third register is, for example, a model-specific register.

Figure 4:
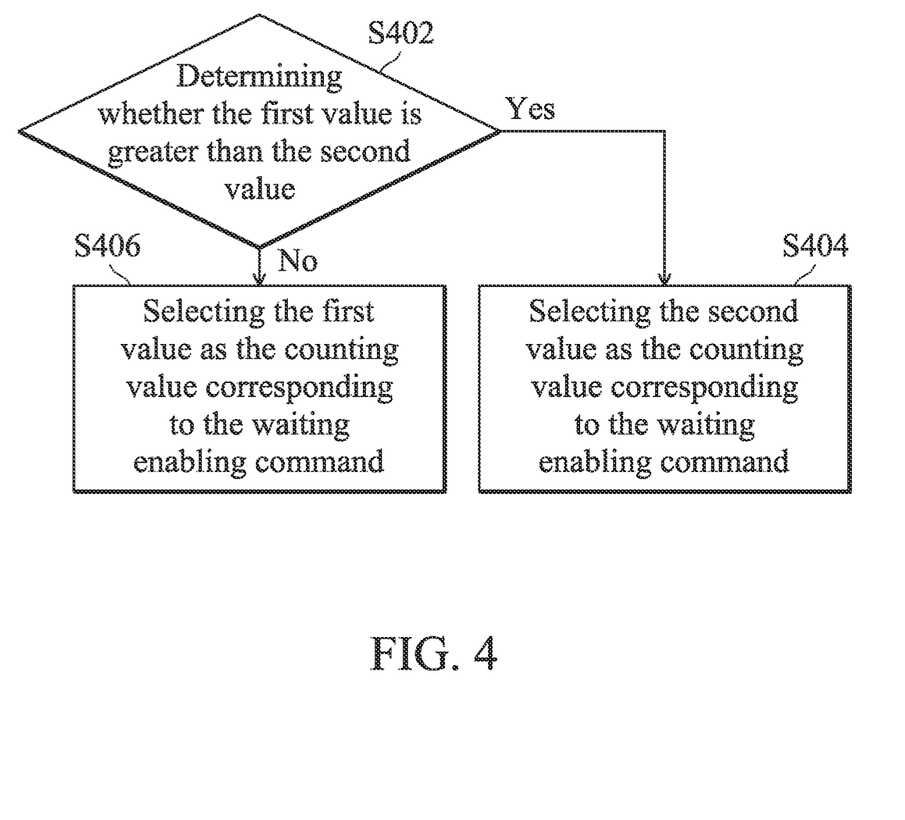
FIG. 4 is a detailed flowchart of step S306 in FIG. 3.

FIG. 4 is a detailed flowchart of step S306 in FIG. 3. In step S402, the method involves determining whether the first value is greater than the second value. When determining that the first value is greater than the second value, the method performs step S404. In step S404, the method involves selecting the second value as the counting value corresponding to the waiting enabling command. When determining that the first value is not greater than the second value, the method performs step S406. In step S406, the method involves selecting the first value as the counting value corresponding to the waiting enabling command.

Figure 5:
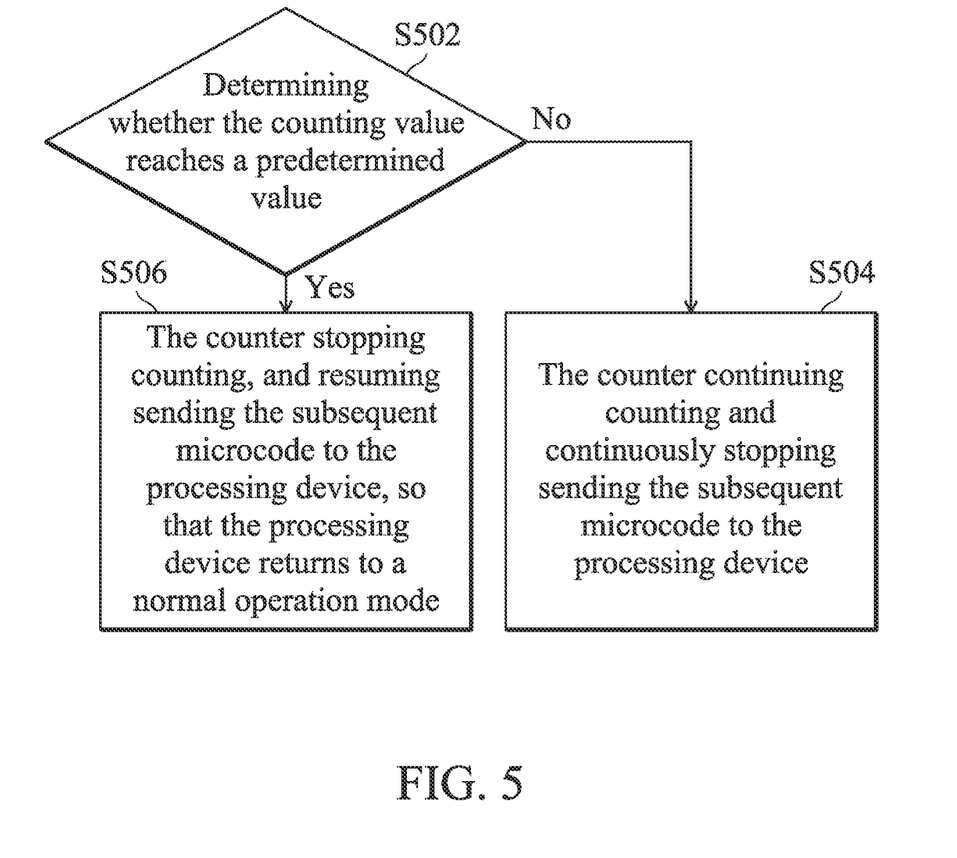
FIG. 5 is a flowchart following step S208 in FIG. 2.

FIG. 5 is a flowchart following step S208 in FIG. 2. In step S502, the method involves determining whether the counting value reaches a predetermined value. When determining that the counting value does not reach the predetermined value, the method performs step S504. In step S504, the method involves the counter continuing counting and continuously stopping sending the subsequent microcode to the processing device. When determining that the counting value reaches the predetermined value, the method performs step S506. In step S506, the method involves the counter stopping counting, and resuming sending the subsequent microcode to the processing device, so that the processing device returns to a normal operation mode.

Figure 6:
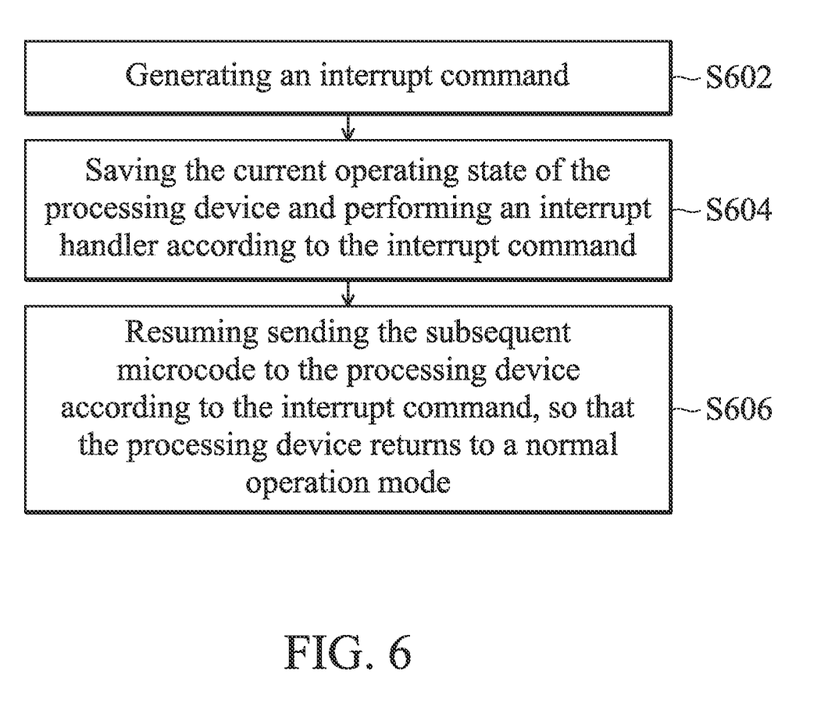
FIG. 6 is another flowchart following step S208 in FIG. 2.

FIG. 6 is another flowchart following step S208 in FIG. 2. In step S602, the method involves generating an interrupt command. In step S604, the method involves saving the current operating state of the processing device and performing an interrupt handler according to the interrupt command. In step S606, the method involves resuming sending the subsequent microcode to the processing device according to the interrupt command, so that the processing device returns to a normal operation mode.

It should be noted that the order of the steps in FIG. 2, FIG. 3, FIG. 4, FIG. 5 and FIG. 6 is only for illustrative purposes, and is not intended to limit the order of the steps of the present disclosure. The user may change the order of the steps above according the requirement thereof. The flowcharts described above may add additional steps or use fewer steps without departing from the spirit and scope of the present disclosure.

In summary, according to the electronic device and the method thereof for controlling power consumption disclosed by the present invention, the processing device receives the busy-waiting command, wherein the busy-waiting command indicates that the operating system of the processing device is in the busy-waiting state. The processing device obtains the microcode of the busy-waiting command according to the busy-waiting command, and generates the waiting enabling command and obtains the counting value corresponding to the waiting enabling command according to the microcode. According to the waiting enabling command, the control device stops sending the subsequent microcode to the processing device, so that the processing device enters an idle state, and the counter is enabled to start counting according to the counting value. Therefore, the power consumption of the electronic device in a busy-waiting state may be effectively controlled, so as to increase the convenience of use.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method of an electronic device for controlling power consumption, comprising:

using a processing device for receiving a busy-waiting command, wherein the busy-waiting command indicates that an operating system of the processing device is in a busy-waiting state;

using the processing device for obtaining a microcode of the busy-waiting command according to the busy-waiting command;

using the processing device for generating a waiting enabling command and obtaining a counting value corresponding to the waiting enabling command according to the microcode; and according to the waiting enabling command, using a control device for stopping sending a subsequent microcode to the processing device, so that the processing device enters an idle state, and a counter of the control device is enabled to start counting according to the counting value.

2. The method of the electronic device for controlling power consumption as claimed in claim 1, further comprising:
determining whether the counting value reaches a predetermined value;
when determining that the counting value does not reach the predetermined value, the counter continuing counting and continuously stopping sending the subsequent microcode to the processing device; and
when determining that the counting value reaches the predetermined value, the counter stopping counting and resuming sending the subsequent microcode to the processing device, so that the processing device returns to a normal operation mode.

3. The method of the electronic device for controlling power consumption as claimed in claim 1, wherein the step of obtaining the counting value corresponding to the waiting enabling command comprises:
reading a first register and a second register of the processing device to obtain a first digit and a second digit, and generating a first value according to the first digit and the second digit;
reading a third register of the processing device to obtain a second value; and
selecting the first value or the second value as the counting value corresponding to the waiting enabling command.

4. The method of the electronic device for controlling power consumption as claimed in claim 3, wherein the step of selecting the first value or the second value as the counting value corresponding to the waiting enabling command comprises:
determining whether the first value is greater than the second value;
when determining that the first value is greater than the second value, selecting the second value as the counting value corresponding to the waiting enabling command; and
when determining that the first value is not greater than the second value, selecting the first value as the counting value corresponding to the waiting enabling command.

5. The method of the electronic device for controlling power consumption as claimed in claim 3, wherein the first register is an EDX register, the second register is an EAX register, and the third register is a model-specific register.

6. The method of the electronic device for controlling power consumption as claimed in claim 1, further comprising:
generating an interrupt command;
saving a current operating state of the processing device and performing an interrupt handler according to the interrupt command; and
resuming sending the subsequent microcode to the processing device according to the interrupt command, so that the processing device returns to a normal operation mode.

7. An electronic device, comprising:
a processing device, configured to receive a busy-waiting command, wherein the busy-waiting command indicates that an operating system of the processing device is in a busy-waiting state, the processing device is configured to obtain a microcode of the busy-waiting command according to the busy-waiting command, and generate a waiting enabling command and obtain a counting value corresponding to the waiting enabling command according to the microcode; and
a control device, coupled to the processing device and comprising a counter, wherein the control device is configured to receive the waiting enabling command, and according to the waiting enabling command, the control device is configured to stop sending a subsequent microcode command to the processing device, so that the processing device enters an idle state, and the counter is enabled to start counting according to the counting value.

8. The electronic device as claimed in claim 7, wherein the control device determines whether the counting value reaches a predetermined value, and when determining that the counting value does not reach the predetermined value, the counter continues counting and the control device continuously stops sending the subsequent microcode to the processing device, and when determining that the counting value reaches the predetermined value, the counter stops counting, and the control device resumes sending the subsequent microcode to the processing device, so that the processing device returns to a normal operation mode.

9. The electronic device as claimed in claim 7, wherein the processing device reads a first register and a second register of the processing device to obtain a first digit and a second digit, and generates a first value according to the first digit and the second digit, the processing device reads a third register of the processing device to obtain a second value, and the processing device selects the first value or the second value as the counting value corresponding to the waiting enabling command.

10. The electronic device as claimed in claim 9, wherein the processing device determines whether the first value is greater than the second value, when determining that the first value is greater than the second value, the processing device selects the second value as the counting value corresponding to the waiting enabling command, and when determining that the first value is not greater than the second value, the processing device selects the first value as the counting value corresponding to the waiting enabling command.

11. The electronic device as claimed in claim 9, wherein the first register is an EDX register, the second register is an EAX register, and the third register is a model-specific register.

12. The electronic device as claimed in claim 7, wherein the operating system of the processing device generates an interrupt command, the processing device saves a current operating state of the processing device and performs an interrupt handler according to the interrupt command, and the control device resumes sending the subsequent microcode to the processing device according to the interrupt command, so that the processing device returns to a normal operation mode.

* * * * *